United States Patent
Seppälä

(10) Patent No.: US 9,614,628 B2
(45) Date of Patent: Apr. 4, 2017

(54) ADAPTING LOCATION BASED BROADCASTING

(75) Inventor: Martta Seppälä, Mt. View, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 1860 days.

(21) Appl. No.: 11/470,450

(22) Filed: Sep. 6, 2006

(65) Prior Publication Data

US 2007/0054634 A1    Mar. 8, 2007

Related U.S. Application Data

(60) Provisional application No. 60/714,259, filed on Sep. 7, 2005.

(51) Int. Cl.
*H04H 60/72* (2008.01)
*H04N 21/426* (2011.01)
(Continued)

(52) U.S. Cl.
CPC ............ *H04H 60/72* (2013.01); *H04H 60/50* (2013.01); *H04H 60/51* (2013.01); *H04W 4/02* (2013.01);
(Continued)

(58) Field of Classification Search
CPC ......... H04W 4/02; H04W 4/20; H04W 64/00; H04W 4/025; H04W 88/06; H04W 8/10;
(Continued)

(56) References Cited

U.S. PATENT DOCUMENTS 6,785,904 B1 * 8/2004 Franken et al. ................ 725/54
7,010,306 B1 * 3/2006 Tanibayashi ............ H04W 4/02
455/432.1
(Continued)

FOREIGN PATENT DOCUMENTS

EP    1388993 A1    2/2004
GB    2396228 A  *  6/2004    ............ G06F 17/30
(Continued)

OTHER PUBLICATIONS

OMA-AD_BCAST-V1_0_0-20050427-D.pdf (Draft Ver. 1.0 dated Apr. 27, 2005 available at member.openmobilealliance.org/ftp/Public_documents/bcast/Permanent_documents/.*
(Continued)

*Primary Examiner* — Allahyar Kasraian
(74) *Attorney, Agent, or Firm* — DITTHAVONG & STEINER, P.C.

(57) ABSTRACT

Provided are apparatuses and methods for providing a program or service transmission with associated ESG fragment(s) to a receiver within a designated location. Parameters, elements or sub-elements may be included in a service guide or other data fragment indicating the location within which the program, service and corresponding ESG fragment(s) may be broadcast. Also, the parameters, elements or sub-elements may be associated with a first network type and may be mapped to corresponding parameters, elements or sub-elements of a second network type. In one example, location parameters, elements or sub-elements corresponding to an OMA BCAST network may be mapped with corresponding location parameters, elements or sub-elements corresponding to a CDMA network. The location information may be transmitted in an ESG fragment or other data fragment. A Network Management module may also be provided for transmitting data to a desired location based on the location information and corresponding mapped location information.

26 Claims, 6 Drawing Sheets (51) Int. Cl.
*H04W 64/00* (2009.01)
*H04H 60/50* (2008.01)
*H04H 60/51* (2008.01)
*H04W 4/02* (2009.01)
*H04H 60/16* (2008.01)
*H04H 60/19* (2008.01)
*H04W 4/06* (2009.01)
*H04W 8/10* (2009.01)
*H04W 48/08* (2009.01)
*H04W 88/06* (2009.01)

(52) U.S. Cl.
CPC ............ *H04H 60/16* (2013.01); *H04H 60/19* (2013.01); *H04W 4/06* (2013.01); *H04W 8/10* (2013.01); *H04W 48/08* (2013.01); *H04W 64/00* (2013.01); *H04W 88/06* (2013.01)

(58) Field of Classification Search
CPC ........ H04L 67/18; H04H 60/16; H04H 60/19; H04H 60/50; H04H 60/72; H04N 21/4126
USPC ............ 455/456.1–456.6, 334, 452.1, 414.1, 455/414.4; 370/401, 432, 433; 725/39, 725/62
See application file for complete search history.

(56) References Cited

U.S. PATENT DOCUMENTS

| | | | |
|---|---|---|---|
| 2003/0013458 A1* | 1/2003 | Yabe et al. .................... | 455/456 |
| 2003/0051246 A1* | 3/2003 | Wilder ............... | H04N 5/44543 725/49 |
| 2004/0110515 A1* | 6/2004 | Blumberg et al. ......... | 455/456.1 |
| 2004/0111746 A1* | 6/2004 | Hoang .......................... | 725/54 |
| 2005/0059409 A1* | 3/2005 | Vare et al. .................. | 455/456.1 |
| 2005/0130673 A1* | 6/2005 | Annamalai ................. | 455/456.2 |
| 2005/0172016 A1* | 8/2005 | Kossi et al. .................. | 709/223 |
| 2005/0281270 A1* | 12/2005 | Kossi et al. ............... | 370/395.5 |
| 2005/0289589 A1* | 12/2005 | Vermola ........................ | 725/35 |
| 2006/0050672 A1* | 3/2006 | Shim et al. .................... | 370/338 |
| 2006/0123099 A1* | 6/2006 | Paila et al. .................... | 709/219 |
| 2006/0221882 A1* | 10/2006 | Jung et al. .................... | 370/312 |
| 2007/0044121 A1* | 2/2007 | Parekh et al. ................... | 725/45 |

FOREIGN PATENT DOCUMENTS

| | | | | |
|---|---|---|---|---|
| GB | 2 404 115 A | 1/2005 | | |
| JP | WO 0109731 A1 * | 2/2001 | ............. | H04W 4/02 |
| JP | EP 1126376 A1 * | 8/2001 | ............. | H04W 4/02 |
| WO | WO 2004056096 A1 * | 7/2004 | ............. | H04N 5/445 |
| WO | 2006044922 A2 | 4/2006 | | |
| WO | 2006059209 A1 | 6/2006 | | |

OTHER PUBLICATIONS

Russian Office Action for corresponding RU Application No. 2008106648/09(007203), Aug. 7, 2009, Russia.
Mexican Office action for corresponding MX App. No. MX/a/2008/002810 dated Jun. 11, 2010, pp. 1-4.
Mexican Office action for corresponding MX App. No. MX/a/2008/002810 dated Sep. 3, 2010, pp. 1-3.
Communication for European Application No. 06795440.4-1505/1922885, dated Mar. 11, 2013, pp. 1-5.
Open Mobile Alliance (OMA), "Mobile Broadcast Services Architecture," Draft Version 1.0, pp. 1-87, dated May 5, 2005, retrieved from the internet: http://member.openmobilealliance.org/ftp/Public_documents/bcast/Permanent_documents/.

* cited by examiner

ADAPTING LOCATION BASED BROADCASTING

CROSS REFERENCE TO RELATED APPLICATIONS

This application claims the benefit of U.S. Provisional Application No. 60/714,259, which was filed Sep. 7, 2005, and which is incorporated herein by reference.

FIELD

Embodiments of the invention relate generally to communications networks. More specifically, embodiments of the invention relate to adapting location based broadcasting to location based services.

BACKGROUND

Digital broadband broadcast networks enable end users to receive digital content including video, audio, data, and so forth. Using a mobile terminal, a user may receive digital content over a wireless digital broadcast network. Digital content can be transmitted wirelessly using packetized transmission, such as provided, for example, by the MPEG-TS (Moving Pictures Experts Group Transport Stream) standard.

There are several broadcast services available. For example, 3GPP (Third-generation Partnership Project) provides broadcast services in Global System for Mobile Communications/Wideband CDMA (GSM/WDCMA), and 3GPP2 (Third-generation Partnership 2) provides broadcast services in CDMA2000. The work item in GSM/WCDMA is Multimedia Broadcast and Multicast Service (MBMS). The work item in CDMA2000 is Broadcast and Multicast Service (BCMCS).

In addition to MBMS of 3GPP and BCMCS of 3GPP2, Open Mobile Alliance (OMA) BCAST, a sub-working group for mobile broadcast services, provides OMA BCAST services such as content protection, service guides, program guides, or transmission scheduling for an underlying broadcast service such as MBMS, BCMCS or digital broadband broadcast systems such as DVB-H (Digital Video Broadcasting handheld).

In a mobile communication system, the location at which a user is positioned may change. Information useful to a user in a designated location may be tailored to that location. For example, weather or traffic information may differ based on location and a user may desire information on, for example, weather of a city where the user is located. However, if the user moves to a second city, the user may then wish to receive weather information in the second city rather than the first city. Also, information pertaining to the location of a subscriber terminal should be accurately provided in a standardized fashion and should not depend on the communication being used, i.e., whether the terminal is using OMA BCAST, MBMS, BCMCS, or any other communication system, such as DVB-H. The communication system should identify the location of the user so that appropriate information may be accurately delivered to the user.

Hence, there is a need to provide a standardized method for providing localization information across varying communication systems.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

In one example, a transmitter is provided for transmitting program or service data and corresponding ESG fragment(s) to a subscriber terminal or receiver within a predetermined location. For example, the transmitter may generate an ESG fragment based on data received from a remote service provider and may include location information in the ESG fragment. The transmitter may also provide for mapping of the location information of a first network type to corresponding location information for a second network type.

In another example, a network management module is provided for receiving a data transmission from a transmitter. The data transmission may include an ESG fragment containing location information. The location information may include a location parameter or element of a first network type. The location parameter or element of the first network type may be mapped to a corresponding location parameter or element of a second network type. The network management module may further transmit data to a receiver or subscriber terminal within the location indicated by the corresponding location parameter and the receiver or subscriber terminal at the designated location may receive the data transmission.

In another example, a method for transmitting data to a predetermined location is provided. In this example, location information including a location parameter of a first network type mapped to a corresponding location parameter of a second network type is received and processed.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the invention.

Figure 1:
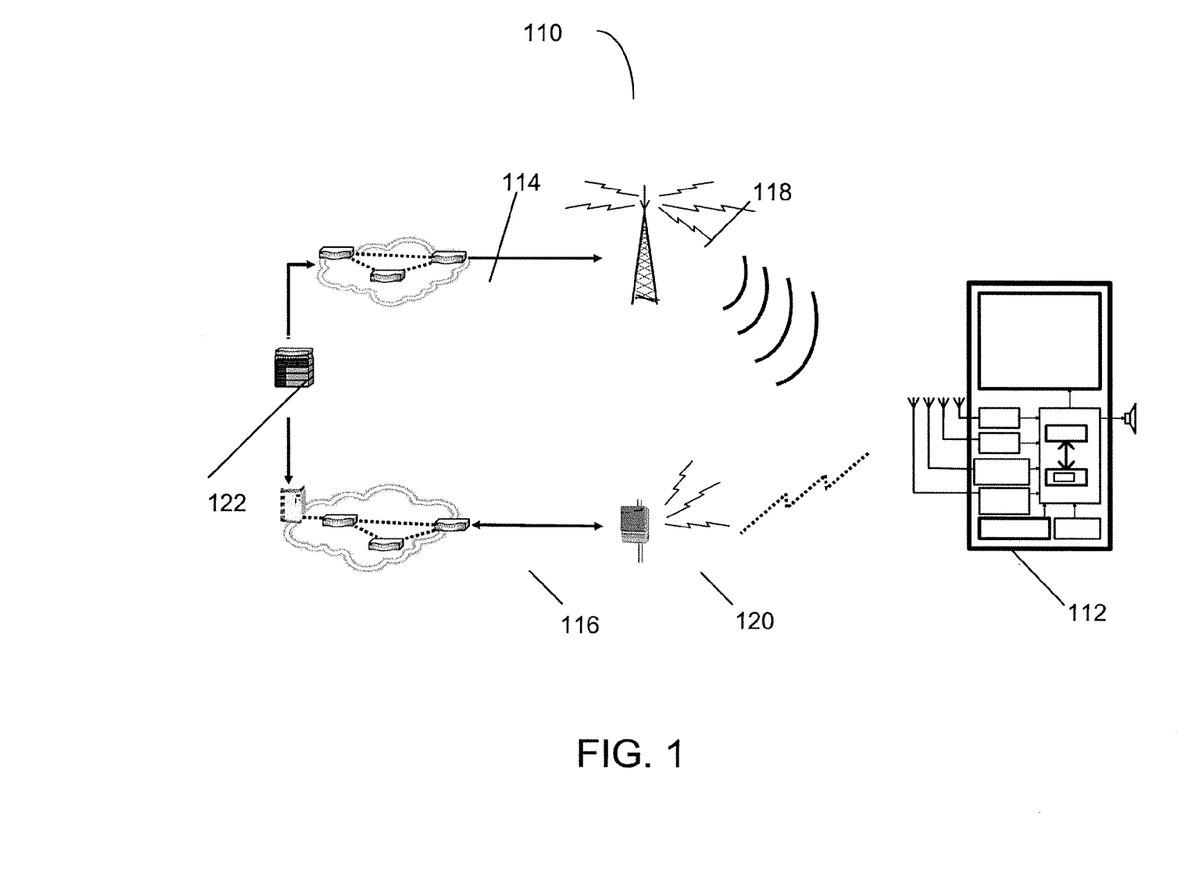
FIG. 1 illustrates a block diagram of a wireless communication system in which various aspects of the invention may be implemented.

Embodiments of the invention may be utilized across a broad array of networks and communication protocols. FIG. 1 illustrates an example of a wireless communication system 110 in which the systems and methods of the invention may be employed. One or more network-enabled mobile devices 112, such as a personal digital assistant (PDA), cellular telephone, mobile terminal, personal video recorder, portable television, personal computer, digital camera, digital camcorder, portable audio device, portable radio, or combinations thereof, are in communication with a service source 122 through a broadcast network 114 and/or cellular network 116. The mobile terminal/device 112 may comprise a digital broadcast receiver device. The service source 122 may be connected to several service providers that may provide their actual program content or information or description of their services and programs to the service source that further provides the content or information to the mobile device 112. The several service providers may include, but are not limited to, one or more television and/or digital television service providers, AM/FM radio service providers, SMS/MMS push service providers, Internet content or access providers.

The broadcast network 114 may include a radio transmission of IP datacasting over DVB-H. The broadcast network 114 may broadcast a service such as a digital or analog television signal and supplemental content related to the service via transmitter 118. The broadcast network may also include a radio, television or IP datacasting broadcasting network. The broadcast network 114 may also transmit supplemental content which may include a television signal, audio and/or video streams, data streams, video files, audio files, software files, and/or video games. In the case of transmitting IP datacasting services, the service source 122 may communicate actual program content to user device 112 through the broadcast network 114 and additional information such as user right and access information for the actual program content through the cellular network 116.

The mobile device 112 may also contact the service source 122 through the cellular network 116. The cellular network 116 may comprise a wireless network and a base transceiver station transmitter 120. The cellular network may include a second/third-generation (2G/3G) cellular data communications network, a Global System for Mobile communications network (GSM), a Universal Mobile Telecommunications System (UMTS) or other wireless communication network such as a WLAN network.

In one aspect of the invention, mobile device 112 may comprise a wireless interface configured to send and/or receive digital wireless communications within cellular network 116. The information received by mobile device 112 through the cellular network 116 or broadcast network 114 may include user selection, applications, services, electronic images, audio clips, video clips, and/or WTAI (Wireless Telephony Application Interface) messages. As part of cellular network 116, one or more base stations (not shown) may support digital communications with receiver device 112 while the receiver device is located within the administrative domain of cellular network 116.

Figure 2:
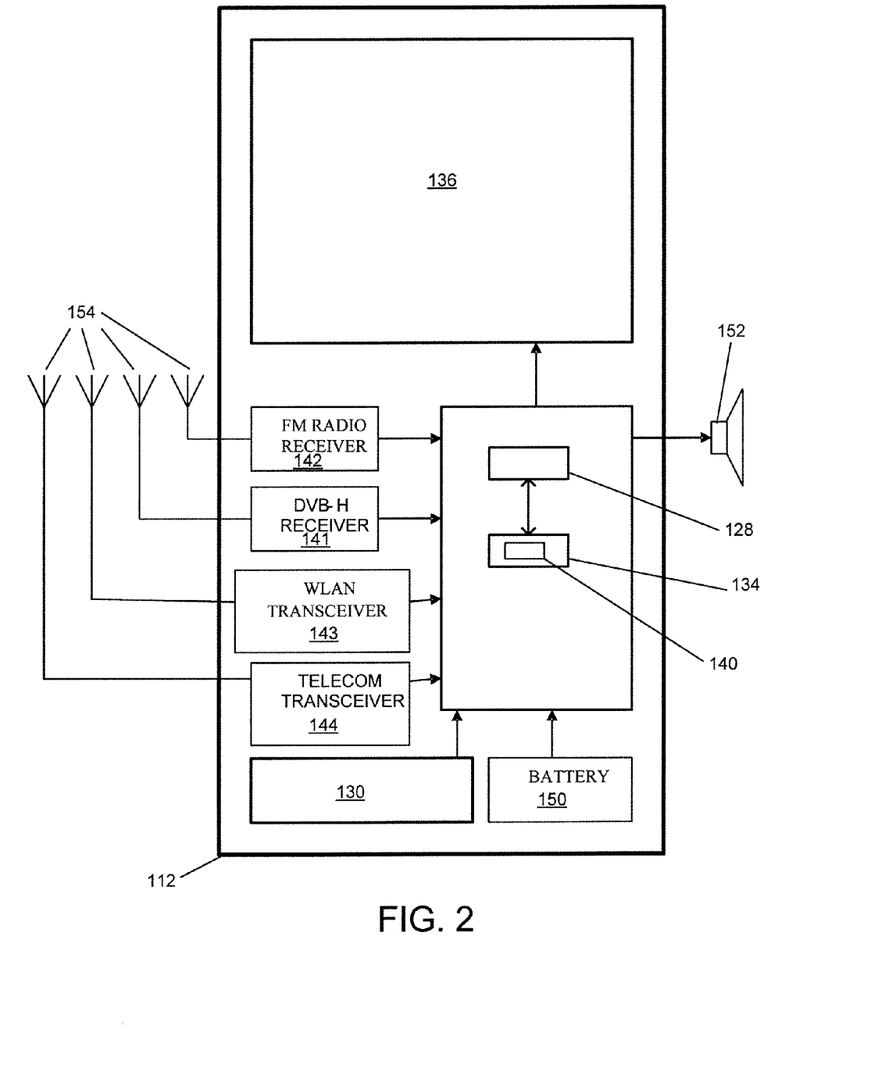
FIG. 2 illustrates a block diagram of a mobile terminal in accordance with an aspect of the invention.

As shown in FIG. 2, mobile device 112 may include processor 128 connected to user interface 130, memory 134 and/or other storage, and display 136. Mobile device 112 may also include battery 150, speaker 152 and antennas 154.

User interface 130 may further include a keypad, touch screen, voice interface, four arrow keys, joy-stick, data glove, mouse, roller ball, touch screen, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory, wherein some of the memory modules may be detachable. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process digital broadband broadcast transmissions that are based, for example, on the Digital Video Broadcast (DVB) standard, such as DVB-H or DVB-MHP, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. Further the mobile device may be configured to receive transmissions based on the Digital Audio Broadcasting (DAB) standard (not shown). In one aspect of the invention, mobile device 112 may receive radio data stream (RDS) messages.

In an example of the DVB standard, one DVB 10 Mbit/s transmission may have 200 50-kbit/s audio program channels or 50 200-kbit/s video (TV) program channels. The mobile device 112 may be configured to receive, decode, and process transmission based on the Digital Video Broadcast-Handheld (DVB-H) standard or other DVB standards, such as DVB-MHP, DVB-Satellite (DVB-S), DVB-Terrestrial (DVB-T) or DVB-Cable (DVB-C). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting-Terrestrial), DAB (Digital Audio Broadcasting), DMB (Digital Multimedia Broadcasting), FLO (Forward Link Only) or DIRECTV. Additionally, the digital transmission may be time sliced, such as in DVB-H technology. Time-slicing may reduce the average power consumption of a mobile terminal and may enable smooth and seamless handover. Time-slicing consists of sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

Information regarding available services may be transmitted to a subscriber terminal or receiver within an Electronic Service Guide (ESG). Thus, an ESG may enable a terminal to communicate what services are available to end users and how the services may be accessed. ESG fragments are independently existing pieces of the ESG. Traditionally, ESG fragments comprise XML documents, but more recently they have encompassed a vast array of items, such as for example, a SDP (Session Description Protocol) description, textual file, or an image. The ESG fragments describe one or several aspects of currently available (or future) service or broadcast programs. Such aspects may include for example: free text description, schedule, geographical availability, price, purchase method, genre, and supplementary information such as preview images or clips. Audio, video and other types of data comprising the ESG fragments may be transmitted through a variety of types of networks including wireless digital broadband broadcast networks according to many different protocols. For example, data can be transmitted through a collection of networks usually referred to as the "Internet" using protocols of the Internet protocol suite, such as Internet Protocol (IP) and User Datagram Protocol (UDP). ESG fragments may also be transmitted by using ALC and FLUTE protocols. Data is often transmitted through the Internet addressed to a single user. It can, however, be addressed to a group of users, commonly known as multicasting. In the case in which the data is addressed to all users it is called broadcasting.

ESG fragments include metadata and descriptions of services or content and are instantiated using a syntax such as XML. Identifiers are used to identify the ESG fragments regarding various attributes of the ESG fragments. However, these identifiers often create large overhead due to their large size. For example, if a Uniform Resource Identifier (URI) is used as an identifier, the overhead is large and unwieldy at 255*8. Therefore, short 32-bit integer identifiers have been used to identify ESG fragments. However, identifiers must be unique for each corresponding ESG fragment. Administration of 32-bit integer identifiers would need to be globally centralized in order to provide the necessary uniqueness of the identifier because ESG fragments from different sources may be identified by non-unique identifiers. For example, as ESG fragments are often aggregated from different sources, each source may not use a standard identifier scheme such that there may be conflicts of identifiers among different sources. In this example, different sources may use the same identifier for corresponding ESG fragments from the different sources. When the different ESG fragments from different source with the same identifier are received at the aggregator, conflicts will arise.

Figure 3:
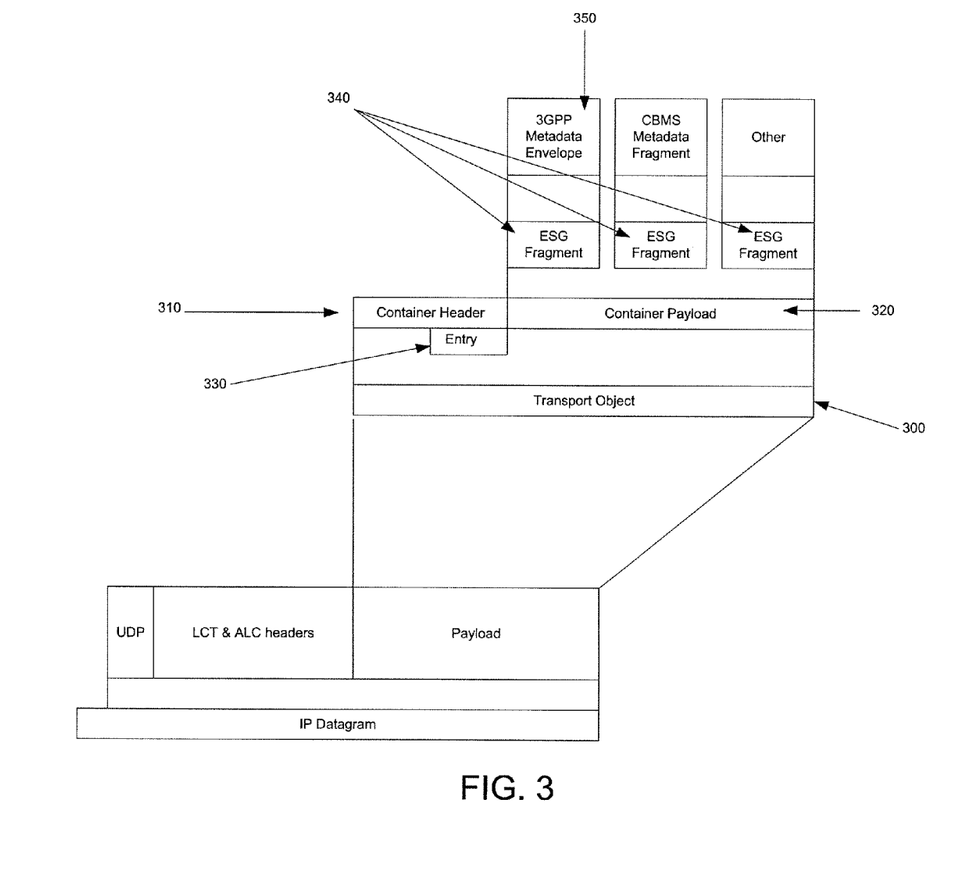
FIG. 3 illustrates a schematic diagram of an example transport object in accordance with an aspect of the invention.

FIG. 3 is a schematic diagram of an example transport object in accordance with at least one aspect of the present invention. Generally, a single transport object 300 comprises a container header 310 and a container payload 320. By incorporating the header 310 and the payload 320 into a single transport object 300, there is no longer a need to recombine each header with the information regarding where each container is located within different transported objects. Furthermore, there is no longer an issue of which to transmit first, as presented in previous systems. The container header 310 may contain configuration information regarding the header and/or the container payload 320. In one embodiment, the header 310 is coded to inform a receiver of the entry length of the header.

In an embodiment, the header 310 may have a plurality of ESG fragment descriptor entries 330 that identify the ESG fragments 340 in the container payload 320 so that the receiver may determine the exact position and/or length of each contained ESG fragment 340. For example, in one embodiment, a field specifies where the particular ESG begins within the container payload 320 by providing, for example, an offset value, start and end points, or the like. In other embodiments, metadata 350 may be associated with the individual ESG fragments 340, located within or proximate to the header 310, descriptor entries 330, an ESG fragment 340 or a mixture thereof. In one exemplary embodiment, the association of a 3GPP metadata envelope with an ESG fragment 340 may substitute, or negate the need, for additional metadata to be located in the header 310 in relation to that particular ESG fragment.

In Open Mobile Alliance (OMA), location of a mobile device may be accomplished with the Mobile Location Protocol (MLP) over IP (OMA LOC—OMA Location Working Group). The MLP identifies the location of the subscriber terminal or receiver based on shape, country code, geopolitical area or horizontal accuracy in meters. Hence, data transmission includes parameters of the MLP that define the location. Programs or services may then be provided based on the location of the subscriber terminal or receiver, for example, in an ESG fragment, a content fragment, or any other data fragment, such as, in a separate location fragment.

The location information may include various parameters including a parameter or element corresponding to a broadcast area. As one example, information on the area in which the broadcast transmission includes may be contained in an element "broadcast_area". The broadcast_area element may contain sub-elements that may provide additional pertinent information that may further define the broadcast area. As an example, the broadcast_area element may contain a target_area sub-element that may be used to define the area of distribution in which the broadcast transmission may be provided. This sub-element may itself include sub-elements. For example, the target_area sub-element of the Broadcast_area element may contain a sub-element describing the shape of the area in which the broadcast transmission may be provided. The shape sub-element may indicate any shape desired, for example, a square, rectangle, triangle, circle oval, etc. As a further example, the target_area sub-element may further include a country code sub-element which may provide a code corresponding to a particular designated country (e.g., a "cc" sub-element). For example, a three digit number may be provided as the country code. As one example, the cc sub-element is "355" corresponding to the country of Albania. It should be recognized that this is merely an example to illustrate the country code parameter, but any number or code may be used for any desired country.

The target_area sub-element may further include a name sub-element that may indicate the name of a geographic area. For example, the target_area sub-element may contain a "name_area" sub-element that may describe the name of a city (e.g., the name_area sub-element may be "Seoul" to describe a city in South Korea). In addition, the target_area sub-element may contain a sub-element describing the zip code of the location if the location has an associated zip code. In this example, the target_area sub-element may contain a zip_code sub-element of an integer type that provides the zip code of the broadcast area. The target_area sub-element may comprise one or more of the sub-elements: shape, cc, name_area and zip_code. They may be used separately or in combination for defining the broadcast area.

In addition to the target_area sub-element to describe the physical area in which the broadcast may be provided, the broadcast area descriptor or element may also contain a parameter or sub-element for describing the horizontal accuracy of the provided broadcast area. For example, a hor-acc sub-element or parameter may be provided within the broadcast_area element or descriptor that may provide the horizontal accuracy, if desired. The horizontal_accuracy may be used in combination with sub-elements of the target_area sub-element for defining the broadcast area.

The following TABLE 1 provides examples of descriptors, elements, parameters, or sub-elements that may provide location information in a mobile broadcast system. Such information may be carried in ESG fragments.

TABLE 1

| Name | Type | Category | Cardinality | Description |
| --- | --- | --- | --- | --- |
| Broadcast_area | E1 | O | 0 . . . 1 | Broadcast area to include location information<br>Subelements:<br>target_area<br>hor_acc |
| target_area | E2 | O | 0 . . . N | Target area to distribute<br>Subelements:<br>shape<br>cc<br>name_area<br>zip-code<br>Cell_ID<br>Cell_Group_ID |
| shape | E3 | O | 0 . . . 1 | Shapes to represent geographic area being described |
| cc | E3 | O | 0 . . . 1 | Country code, e.g., 1–3 digits |
| name_area | E3 | O | 0 . . . 1 | Geopolitical name of area |
| zip_code | E3 | O | 0 . . . 1 | Zip code |
| hor_acc | E2 | O | 0 . . . N | Horizontal accuracy |

Where the type can be an Element (E), an Attribute (A), a first level sub-element (E1), a second level sub-element (E2), or a third level sub-element (E3), and the category can be optional (O) or preferred/mandatory (M).

In OMA BCAST service (a sub-working group of the OMA "Browser and Content" working Group), these parameters and elements may also be used by an OMA BCAST enabler to provide location information of a subscriber terminal or receiver and location based broadcasting services based on the location of the receiver.

In CDMA2000, the Third-Generation Partnership Project 2 (3GPP2) addresses broadcast services using Broadcast and Multicast Service (BCMS) as the work item. In a CDMA2000 system, location information may be provided in different ways from OMA BCAST. Hence, providing location information in an OMA BCAST environment may require adaptation to be usable in a CDMA2000 embodiment. Also, CDMA2000 provides location information in different ways based on the type of network. For example, in a circuit switched network, CDMA2000 may provide location information differently than in a packet switched network.

For example, in a packet-switched CDMA network (i.e., a 3GPP2 IP-based network), such as Evolution Data Only, Evolution Data Optimized (EV-DO) networks, is defined according to 3GPP2 X.P0023, incorporated herein in its entirety, and optionally refers to the Mobile Location Protocol (MLP). However, in a circuit-switched CDMA network, such as a "1X" network, Mobile Location Protocol (MLP) may not be supported. Hence, the parameters for identifying location under MLP are not fully applicable to a circuit-switched CDMA network. For example, the circuit-switched CDMA network may not utilize such parameters as country code, geopolitical area or horizontal accuracy in determining location. Rather, these and other parameters may be merely informational in nature in a circuit-switched CDMA network as they may not be supported.

In one example of the invention, location parameters and elements are adapted for use in a plurality of network systems. For example, location parameters are delivered in an ESG fragment and may be mapped from one network type to another network type. To illustrate, location parameters as part of OMA BCAST, as provided in the table above, may be applied in BCMCS of CDMA2000. The location parameters may be signaled in the network in a variety of ways. For example, the location parameters may be signaled to a user or an OMA BCAST server in a service guide. The location parameters may also be signaled to a network management module or as a separate file that may be linked by an extension URL or sent as a separate content file. These location parameters may be mapped to adapted location parameters in which a distinct network may be recognized. The distinct network may utilize the adapted location parameters to identify the location of the subscriber terminal or receiver.

As an example, an ESG fragment containing location parameters in a network using OMA BCAST may be transmitted to a CDMA2000 circuit-switched network. The location parameters may include location parameters that are recognized in a network using OMA BCAST but are incompatible in a CDMA 2000 circuit-switched network. As an example, a country code, geopolitical area or horizontal accuracy location parameter, as defined in a network using OMA BCAST, may be incompatible for use in a CDMA200 circuit-switched network. As such, these incompatible location parameters may be either ignored or used for information purposes only. In this example of the invention, the location parameters transmitted in the network using OMA BCAST (e.g., in an ESG fragment or other data fragment) may be mapped in the data fragment to adapted location parameters that may be used in a CDMA2000 circuit-switched network. The adapted location parameters may be contained, for example, in the data fragment such as an ESG fragment, a separate file related to the service guide, a separate file linked by URL, etc. The adapted location parameters, as mapped to the location parameters, may further be signaled to a network entity, such as a user, network management module, an OMA BCAST server, etc., such that location information may be transmitted and utilized in a separate network, such as CDMA2000.

The following TABLE 2 provides an example of location parameters and corresponding mapped (or adapted) location parameters.

TABLE 2

| Name | Mapped to: Name (in 3GPP2) | Type | Category | Cardinality | Description |
|---|---|---|---|---|---|
| Broadcast_area | Broadcast_area_3gpp2 | E1 | O | 0 . . . 1 | Broadcast area to include location information Subelements: target_area hor_acc |
| target_area | target_area_3gpp2 | E2 | O | 0 . . . N | Target area to distribute Subelements: shape cc name_area zip-code |
| shape_BCMCS | shape_3gpp2 | E3 | O | 0 . . . 1 | Shapes to represent geographic area being described |
| cc_BCMCS | cc_BCMCS_3gpp2 | E3 | O | 0 . . . 1 | Country code, e.g., 1–3 digits |
| name_area | name_area_3gpp2 | E3 | O | 0 . . . 1 | Geopolitical name of area |
| zip_code | zip_code_3gpp2 | E3 | O | 0 . . . 1 | Zip code |
| hor_acc | hor_acc_3gpp2 | E2 | O | 0 . . . N | Horizontal accuracy |

Where the type can be an Element (E), an Attribute (A), a first level sub-element (E1), a second level sub-element (E2), or a third level sub-element (E3) and the category can be optional (O) or preferred/mandatory (M).

Figure 4:
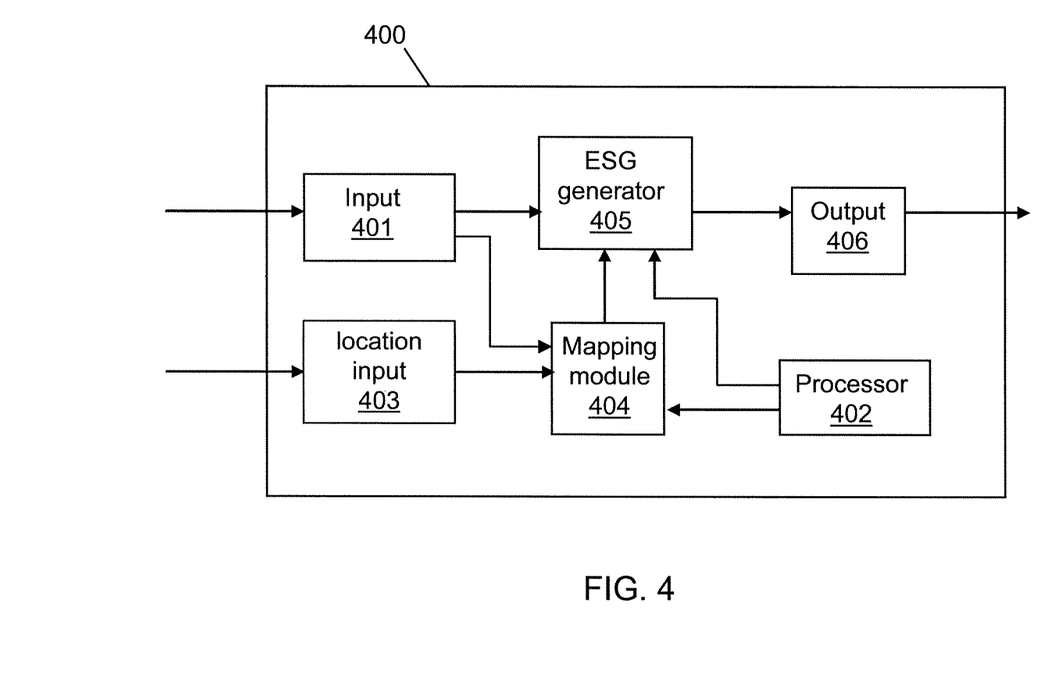
FIG. 4 is a partial block diagram illustrating one example of a transmitter for transmitting broadcast data to a location in which one or more illustrative embodiments of the invention may be implemented.

FIG. 4 is a partial block diagram illustrating an example of a transmitter in accordance with embodiments of the invention. In this example, a transmitter 400 may include an input 401 for receiving data from a remote source that may be transmitted in an ESG fragment. The ESG fragment may contain information pertaining to a corresponding program or service. Also, the transmitter 400 may contain a location input 403 that may receive location information of a receiver or subscriber terminal. The location input 403 may also receive location information corresponding to a location in which the transmitter may deliver a broadcast transmission. The location information may include, for example, parameters corresponding to the location where the broadcast transmission may be transmitted such as a target area indicator parameter, a shape parameter that may describe the shape of the geographic area for transmission, a country code, a zip code, etc.

The input data received at the input 401 and the location input received at the location input 403 may be processed in a mapping module 404. The mapping module 404 may be controlled by a processor 402 to map the location information received at the location input 403. For example, the location information may include parameters or elements corresponding to characteristics of the area in which the broadcast transmission is to be transmitted. These location parameters may be processed in the mapping module 404 to include corresponding location parameters for alternate networks. For example, the mapping module may form a table in which each parameter or element of the location information is mapped with a corresponding equivalent location parameter or element for an alternate network or system. The location information including the mapped corresponding location parameters or elements may be contained in an ESG fragment. In this example, the data for transmission in an ESG fragment may be received at the input 401 and incorporated into an ESG fragment by the ESG fragment generator 405. The ESG fragment generator 405 may also receive the location information and mapped corresponding location information including parameters or elements and include the location information in the ESG fragment for transmission. The ESG fragment generator creates the ESG fragment corresponding to a program or service and outputs the ESG fragment via the output 406.

Figure 5:
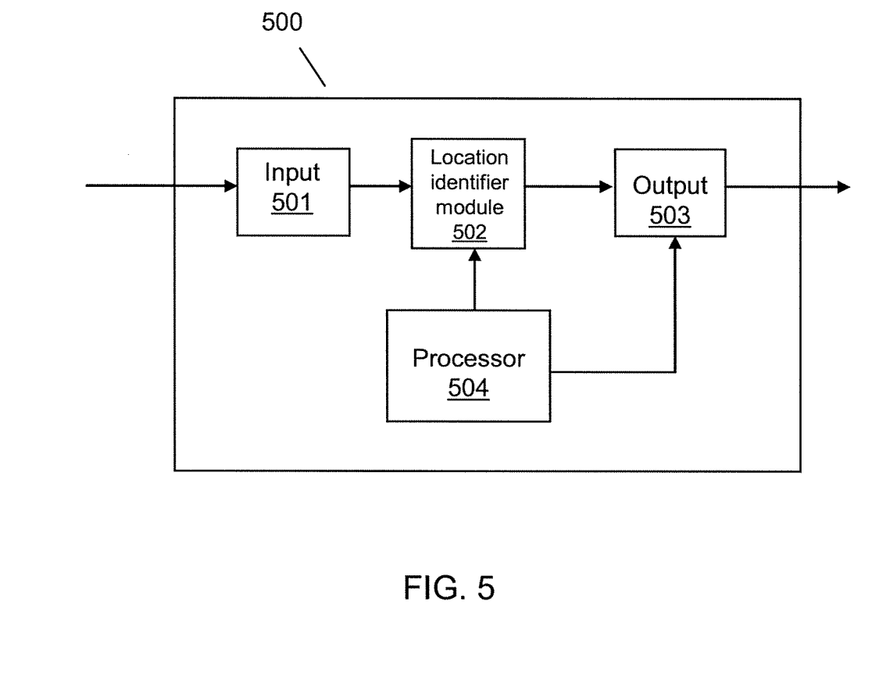
FIG. 5 is a partial block diagram illustrating an example of a network management module in which one or more illustrative embodiments of the invention may be implemented.

FIG. 5 is a partial block diagram illustrating an example of a network management module. The network management module 500 may receive an ESG fragment or other data fragment (such as a location fragment) from a transmitter or receiver in a network. The network management module 500 may include an input 501 for receiving input from a transmitter or receiver in a network. Data received at the input 501 may include an ESG fragment containing location information of a receiver or subscriber terminal. Based on the location information received at the input 501, the network management module 500 may transmit data to a particular location. For example, the ESG fragment or other data fragment received at the input 501 may be processed at a location identifier module 502, which obtains the location information from the ESG or other data fragment. The location information may include parameters or elements indicating characteristics of the location where a data broadcast is to be transmitted. For example, the location information may include a parameter identifying a country code, zip code, geopolitical name, etc. Also, the data received at the input 501 may include mapping information in which parameters or elements associated with location information of a particular network type may be mapped or correlated with corresponding parameters or elements associated with another network type. As an example, the location information may include location parameters in Mobile Location Protocol (MLP) of OMA BCAST which may each be mapped to a corresponding location parameter in CDMA networks. The location identifier module 502, based on the location information and corresponding mapped location information, may output data via an output 503 to the network. The data transmitted may be received at a receiver or subscriber station (not shown) within the designated area (i.e., the location).

In one example, the network management module is within the transmitter 400 such that the transmitter may transmit data or ESG fragment information to a designated location. In another example, the network management module is within the network but is separate from the transmitter. For example, the network management module may be a server at a remote source. In another example, the network management module is in a receiver or subscriber terminal such that the receiver or subscriber terminal may receive the data transmission if the receiver or subscriber terminal is in the designated area indicated by the location information or parameters.

Figure 6:
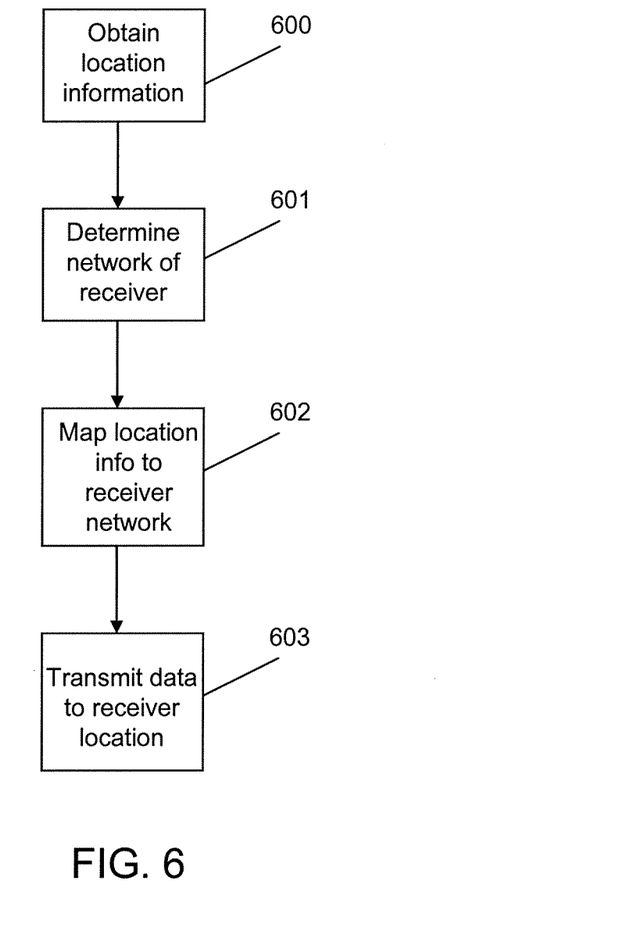
FIG. 6 is a flow chart illustrating an example of defining location in a mobile broadcasting system for program or service transmission in which one or more illustrative embodiments of the invention may be implemented.

FIG. 6 is a flowchart illustrating an example of a method for transmitting data to a designated location based on location information in accordance with embodiments of the invention. In this example, location information is obtained (STEP 600). Location information may include, for example, parameters or elements identifying characteristics of a location to which a data transmission is to be transmitted. For example, the location information may include a parameter indicating the target area. Also, each element or parameter may include additional sub-elements. Examples of sub-elements may include a sub-element indicating the country code, the geopolitical name of a location or a zip code, to name a few. The location information may be obtained from a variety of sources such as, but not limited to, the receiver, a network management module, a transmitter, a server, or any network component.

In STEP 601, a network type is identified in which a receiver or subscriber terminal may be located. For example, a receiver or subscriber terminal may be identified as being in a network using specifications according to OMA BCAST. Alternatively, the receiver or subscriber terminal may be identified as being in a CDMA2000 network.

Based on the network type, the location information may be mapped to location parameters or elements corresponding to the network type. For example, the location information may include parameters or elements associated with a network adhering to OMA BCAST. If the network is determined to be a CDMA2000 network, the location information is mapped, in STEP 602, into location parameters or elements corresponding to the CDMA2000 network. For example, each location parameter or element according to OMA BCAST is coupled with a corresponding CDMA2000 location parameter or element. As one example, a table may be constructed for mapping each location parameter or element of one network with a corresponding location parameter or element of another network (networks using OMA BCAST and CDMA2000 network in this example). Thus, the location to which the data is to be transmitted is identified and the data may be transmitted to the location (STEP 603).

Embodiments of the invention include any novel feature or combination of features disclosed herein either explicitly or any generalization thereof. While embodiments of the invention have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

The invention claimed is:

1. An apparatus comprising:
at least one processor; and
at least one memory including computer program code, the at least one memory and the computer program code configured to, with the at least one processor, cause the apparatus to perform at least the following,
receive data to be transmitted to a designated geographic location;
receive, in an electronic service guide fragment of an electronic service guide, a parameter for a first network corresponding to the designated geographic location; and
determine to directly map or adapt the parameter corresponding to the designated geographic location to a corresponding geographic location parameter which covers the designated geographic location for a second network, wherein the first network adheres to a first mobile communication protocol, and the second network adheres to a second mobile communication protocol that does not utilize or support the geographic location parameter of the first mobile communication protocol; and
wherein the first mobile communication protocol adheres to open mobile alliance broadcast (OMA) BCAST, and the second mobile communication protocol adheres to code division multiple access (CDMA).

2. The apparatus of claim 1, wherein the apparatus is further caused to determine to allocate the data to be transmitted to the designated geographic location based on the corresponding geographic location parameter for the second network.

3. The apparatus of claim 2, wherein the apparatus is further caused to determine to transmit the data to the designated geographic location.

4. The apparatus of claim 1, wherein the apparatus is further caused to determine to transmit broadcast data to the designated geographic location based on the mapped or adapted geographic location parameter.

5. The method of claim 1, wherein the first mobile communication protocol or the second mobile communication protocol relates to a digital content broadcasting protocol.

6. The method of claim 5, wherein the digital content broadcasting protocol includes open mobile alliance broadcast (OMA) BCAST.

7. An apparatus comprising:
at least one processor; and
at least one memory including computer program code, the at least one memory and the computer program code configured to, with the at least one processor, cause the apparatus to perform at least the following,
receive an electronic service guide data fragment of an electronic service guide, the data fragment including geographic location information, the geographic location information including a geographic location parameter for a first network corresponding to a designated geographic location which is a destination of the data fragment;
extract the geographic location information from the data fragment; and
determine to directly map or adapt the geographic location parameter to a corresponding geographic location parameter which covers the designated geographic location for the second network, wherein the first network adheres to a first mobile communication protocol, and the second network adheres to a second mobile communication protocol that does not utilize or support the geographic location parameter of the first mobile communication protocol; and
wherein the first mobile communication protocol adheres to open mobile alliance broadcast (OMA) BCAST, and the second mobile communication protocol adheres to code division multiple access (CDMA).

8. The apparatus of claim 7, wherein the apparatus is further caused to determine to transmit data to the designated geographic location based on the mapped or adapted geographic location parameter.

9. A method comprising:
receiving, in an electronic service guide fragment of an electronic service guide, geographic location information, the geographic location information including a geographic location parameter of a first mobile communication protocol, the geographic location parameter corresponding to a designated geographic location where broadcast data is to be transmitted;
determining a second mobile communication protocol corresponding to the designated geographic location;
determining whether the second mobile communication protocol utilizes or supports the geographic location parameter of the first mobile communication protocol; and selectively determining to map or adapt the geographic location parameter of the first mobile communication protocol to a corresponding geographic location parameter which covers the designated geographic location for the second mobile communication protocol; and
wherein the first mobile communication protocol adheres to open mobile alliance broadcast (OMA) BCAST, and the second mobile communication protocol adheres to code division multiple access (CDMA).

10. The method of claim 9, wherein the geographic location parameter of the first mobile communication protocol is selected from the group consisting of broadcast_area, target_area, shape, country_code, name_area, zip_ code, and horizontal_accuracy.

11. The method of claim 10, wherein the corresponding geographic location parameter for the second mobile communication protocol corresponding to the geographic location in which the broadcast data is to be transmitted is selected from the group consisting of broadcast_area, target_area, shape, country_code, name_area, zip_code, and horizontal_accuracy.

12. The method of claim 10, wherein sub-elements of the horizontal_accuracy are used in conjunction with sub-elements of the target_area for defining a broadcast area.

13. The method of claim 9, wherein the corresponding geographic location parameter for the second mobile communication protocol is selected from the group consisting of broadcast_area_3gpp2, target_area-3gpp2, shape_3gpp2, cc_BCMCS_3gpp2, name_area_3gpp2, zip code_3gpp2, and hor_acc_3gpp2.

14. The method of claim 9, further comprising:
if the second mobile communication protocol does not utilize or support the geographic location parameter of the first mobile communication protocol, determining to map or adapt the geographic location parameter of the first mobile communication protocol to the corresponding geographic location parameter for the second mobile communication protocol.

15. The method of claim 14, further comprising:
determining to transmit the broadcast data based on the mapped or adapted geographic location parameter.

16. An apparatus comprising:
at least one processor; and
at least one memory including computer program code, the at least one memory and the computer program code configured to, with the at least one processor, cause the apparatus to perform at least the following,
receive, in an electronic service guide fragment of an electronic service guide, geographic location information, the geographic location information including a geographic location parameter of a first mobile communication protocol, the geographic location parameter corresponding to a designated geographic location where broadcast data is to be transmitted;
determine a second mobile communication protocol corresponding to the designated geographic location;
determine whether the second mobile communication protocol utilizes or supports the geographic location parameter of the first mobile communication protocol; and
selectively determine to map or adapt the geographic location parameter of the first mobile communication protocol to a corresponding geographic location parameter which covers the designated geographic location for the second mobile communication protocol; and
wherein the first mobile communication protocol adheres to open mobile alliance broadcast (OMA) BCAST, and the second mobile communication protocol adheres to code division multiple access (CDMA).

17. The apparatus of claim 16, wherein the geographic location parameter of the first mobile communication protocol is selected from the group consisting of broadcast_area, target_area, shape, country_code, name_area, zip_code, and horizontal_accuracy.

18. The apparatus of claim 17, wherein sub-elements of the horizontal_accuracy are used in conjunction with sub-elements of the target_area for defining a broadcast area.

19. The apparatus of claim 17, wherein the corresponding geographic location parameter for the second mobile communication protocol is selected from the group consisting of broadcast_area, target_area, shape, country_code, name_area, zip_code, and horizontal_accuracy.

20. The apparatus of claim 16, wherein the corresponding geographic location parameter for the second mobile communication protocol is selected from the group consisting of broadcast_area_3gpp2, target_area-3gpp2, shape_3gpp2, cc_BCMCS_3gpp2, name_area_3gpp2, zip_code_3gpp2, and hor_acc_3gpp2.

21. The apparatus of claim 16, wherein the apparatus is further caused to determine to transmit the broadcast data to the geographic location based on the mapped or adapted geographic location parameter.

22. The apparatus of claim 16, wherein the apparatus is further caused to: if the second mobile communication protocol does not utilize or support the geographic location parameter of the first mobile communication protocol, determine to map or adapt the geographic location parameter of the first mobile communication protocol to the corresponding geographic location parameter for the second mobile communication protocol.

23. The apparatus of claim 16, wherein the apparatus is further caused to determine to transmit the broadcast data based on the mapped or adapted geographic location parameter.

24. A method comprising:
receiving data to be transmitted to a designated geographic location;
receiving, in an electronic service guide fragment of an electronic service guide, a parameter for a first network corresponding to the designated geographic location; and
determining to directly map or adapt the parameter corresponding to the designated geographic location to a corresponding geographic location parameter which covers the designated geographic location for a second network,
wherein the first network adheres to a first mobile communication protocol, and the second network adheres to a second mobile communication protocol that does not utilize or support the geographic location parameter of the first mobile communication protocol; and wherein the first mobile communication protocol adheres to open mobile alliance broadcast (OMA) BCAST, and the second mobile communication protocol adheres to code division multiple access (CDMA).

25. A method comprising:

receiving an electronic service guide data fragment of an electronic service guide, the electronic service guide data fragment including geographic location information, the geographic location information including a geographic location parameter for a first network corresponding to a designated geographic location which is a destination of the electronic service guide data fragment;

extracting the geographic location information from the data fragment; and determining to directly map or adapt the geographic location parameter to a corresponding geographic location parameter which covers the designated geographic location for a second network, wherein the first network adheres to a first mobile communication protocol, and the second network adheres to a second mobile communication protocol that does not utilize or support the geographic location parameter of the first mobile communication protocol; and wherein the first mobile communication protocol adheres to open mobile alliance broadcast (OMA) BCAST, and the second mobile communication protocol adheres to code division multiple access (CDMA).

26. A non-transitory computer readable storage medium containing computer executable instructions for causing an apparatus to perform the steps comprising:

receiving, in an electronic service guide data fragment of an electronic service guide, geographic location information, the geographic location information including a geographic location parameter, of a first mobile communication protocol, the geographic location parameter corresponding to a designated geographic location where broadcast data is to be transmitted;

determining a second mobile communication protocol corresponding to the designated geographic location;

determining whether the second mobile communication protocol utilizes or supports the geographic location parameter of the first mobile communication protocol; and selectively determining to map or adapt the geographic location parameter of the first mobile communication protocol to a corresponding geographic location parameter which covers the designated geographic location for the second mobile communication protocol; and wherein the first mobile communication protocol adheres to open mobile alliance broadcast (OMA) BCAST, and the second mobile communication protocol adheres to code division multiple access (CDMA).

* * * * *